UNITED STATES PATENT OFFICE.

ARTHUR L. GRANT AND CHARLES GORDON RICHARDSON, OF TORONTO, CANADA; SAID GRANT ASSIGNOR TO ARTHUR BAWDEN ENGLISH, OF SAME PLACE.

PROCESS OF TREATING ORES CONTAINING NICKEL.

SPECIFICATION forming part of Letters Patent No. 490,847, dated January 31, 1893.

Application filed April 4, 1892. Serial No. 427,722. (No specimens.) Patented in Canada April 14, 1892, No. 38,745.

*To all whom it may concern:*

Be it known that we, ARTHUR LAW GRANT and CHARLES GORDON RICHARDSON, both of the city of Toronto, in the county of York, in the Province of Ontario, Canada, have invented certain new and useful Improvements in the Process of Treating Ores Containing Nickel in Combination with Sulphur and Iron as Sulphides, of which the following is a specification, and for which we have obtained Letters Patent of the Dominion of Canada, dated April 14, 1892, and numbered 38,745.

This invention relates to an improved process of treating ores containing nickel in combination with sulphur generally, but particularly to a process of treating such ores which contain sulphur and iron together with sulphur and copper in the form of sulphides, so as to free the sulphide of nickel, or sulphides of nickel and copper, from the iron and produce a matte of sulphide of nickel, or sulphides of nickel and copper, for further reduction in the ordinary manner.

The invention consists broadly in subjecting the ores in conjunction with the sulphate of calcium, and silica, or a suitable silicate to the action of heat until fused; whereby the sulphur of the sulphide of iron is oxidized and is driven off; the iron oxidized and the nickel, or nickel and copper, freed therefrom in the form of a sulphide or sulphides.

In practicing our invention, the ore, pulverized, is mixed with sulphate of lime or other suitable sulphate, either in the form of powder or otherwise, and silica, either in the form of quartz or otherwise, and with or without clay or other aluminium silicates, and the whole placed in a suitable furnace preferably a crucible furnace, apart from air, and heated until fusion is effected, and when fused the mass is kept fluid by a continued application of heat until the desired amount of oxidation has been effected, leaving the nickel or nickel and copper in the form of a sulphide or sulphides, the whole forming when cooled a mass of silicates of iron, calcium, and aluminium, with the nickel, or nickel and copper, in the form of sulphide or sulphides, separated in the form of matte from the mass of silicates; the resulting matte is then treated by any of the usual or ordinary methods for reduction to metallic nickel, or nickel and copper.

The sulphurous acid gas resulting from the oxidation of the iron sulphide, and the concomitant decomposition of the sulphate of calcium in the above process, substantially as described, may then be utilized by any of the ordinary methods for the production of sulphuric acid.

Having thus described our invention, what we claim and desire to secure by Letters Patent is:—

1. The process herein described of treating ores containing sulphur in combination with metallic bodies, the same consisting in subjecting said ores in conjunction with sulphate of calcium, or other sulphate, and silica or silicates to the action of heat until fused, whereby the sulphur in combination with an easily oxidizable metal such as iron is oxidized and driven off and the less easily oxidizable metals such as nickel or nickel and copper left in the form of a sulphide or sulphides which separates from the resultant slag of calcium and other silicate compounds, substantially as described.

2. The process herein described of treating nickel ores containing sulphur, the same consisting in subjecting the ores to the action of sulphate of calcium, or other suitable sulphate, and heat, whereby the sulphur combined with the iron in the ore is oxidized, the sulphate of calcium decomposed and a greater part of its sulphur liberated, substantially as specified.

Toronto, March 28, 1892.

ARTHUR L. GRANT.
CHARLES GORDON RICHARDSON.

In presence of—
I. EDW. MAYBEE,
W. G. MCMILLAN.